US012767601B2

(12) United States Patent
Murata

(10) Patent No.: US 12,767,601 B2
(45) Date of Patent: Oct. 20, 2026

(54) DIELECTRIC CERAMIC COMPOSITION AND CERAMIC CAPACITOR

(71) Applicant: Murata Manufacturing Co., Ltd., Nagaokakyo (JP)

(72) Inventor: Tomoki Murata, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 205 days.

(21) Appl. No.: 18/646,513

(22) Filed: Apr. 25, 2024

(65) Prior Publication Data

US 2024/0294438 A1 Sep. 5, 2024

Related U.S. Application Data

(63) Continuation of application No. PCT/JP2022/040331, filed on Oct. 28, 2022.

(30) Foreign Application Priority Data

Nov. 4, 2021 (JP) ................................. 2021-180445

(51) Int. Cl.
*H01G 4/12* (2006.01)
*C04B 35/495* (2006.01)
*H01G 4/30* (2006.01)

(52) U.S. Cl.
CPC ......... *C04B 35/495* (2013.01); *H01G 4/1209* (2013.01); *H01G 4/30* (2013.01);
(Continued)

(58) Field of Classification Search
CPC .......... C04B 35/495; C04B 2235/3255; C04B 2235/3262; C04B 2235/3272;
(Continued)

(56) References Cited

U.S. PATENT DOCUMENTS 7,727,921 B2 6/2010 Takeda
8,853,115 B2 10/2014 Iguchi et al.
(Continued)

FOREIGN PATENT DOCUMENTS

JP 2002-338355 A 11/2002
JP 2013-180908 A 9/2013
(Continued)

OTHER PUBLICATIONS

International Search Report received for PCT Patent Application No. PCT/JP2022/040331, mailed on Dec. 20, 2022, 2 pages (English Translation Only).
(Continued)

*Primary Examiner* — Arun Ramaswamy
(74) *Attorney, Agent, or Firm* — ArentFox Schiff LLP

(57) ABSTRACT

A dielectric ceramic composition that includes an oxide (I) of A, R, and B, in which the oxide (I) has a tetragonal tungsten bronze type structure; the A contains K and Ba; the R is at least one selected from a group consisting of La, Ce, Pr, Nd, Sm, Eu, Gd, Tb, Dy, Ho, Er, Tm, Yb, Lu, Y, and Sc; the B is at least one selected from a group consisting of Nb and Ta; the B is contained in an amount of 4.75 mol or more and 5.25 mol or less with respect to 2 mol of the A; and the A, R, and B are contained in a total molar fraction of 0.975 or more with respect to all metal elements contained in the dielectric ceramic composition.

19 Claims, 2 Drawing Sheets

(52) U.S. Cl.
CPC ................. *C04B 2235/3255* (2013.01); *C04B 2235/3262* (2013.01); *C04B 2235/3272* (2013.01); *C04B 2235/3281* (2013.01); *C04B 2235/3418* (2013.01); *C04B 2235/765* (2013.01)

(58) Field of Classification Search
CPC .... C04B 2235/3281; C04B 2235/3418; C04B 2235/765; H01G 4/1209; H01G 4/1227
USPC ............. 361/301.4, 321.1, 321.4, 321.5, 311
See application file for complete search history.

(56) References Cited

U.S. PATENT DOCUMENTS

| | | | | |
|---|---|---|---|---|
| 10,759,709 | B2 | 9/2020 | Akiba et al. | |
| 11,837,410 | B2 | 12/2023 | Murata et al. | |
| 2003/0020157 | A1* | 1/2003 | Natori | C04B 35/01 257/E21.664 |
| 2009/0290285 | A1 | 11/2009 | Takeda | |
| 2013/0222969 | A1 | 8/2013 | Iguchi et al. | |
| 2014/0177130 | A1* | 6/2014 | Park | H01G 4/30 361/301.4 |
| 2015/0295162 | A1* | 10/2015 | Yamazaki | C04B 35/495 264/618 |
| 2017/0372840 | A1 | 12/2017 | Takahashi | |
| 2019/0256425 | A1 | 8/2019 | Akiba et al. | |
| 2022/0028614 | A1 | 1/2022 | Murata et al. | |
| 2022/0170178 | A1* | 6/2022 | Zelner | H10N 30/8536 |

FOREIGN PATENT DOCUMENTS

| | | | |
|---|---|---|---|
| JP | 2018-002497 | A | 1/2018 |
| JP | 2018-104209 | A | 7/2018 |
| WO | 2008/102608 | A1 | 8/2008 |
| WO | 2017/163844 | A1 | 9/2017 |
| WO | 2020/240986 | A1 | 12/2020 |

OTHER PUBLICATIONS

Neurgaonkar et al., "Ferroelectric and structural properties of the Tungsten Bronze system K2Ln3+Nb5O15, Ln = La to Lu", Mat. Res. Bull., Pergamon Press plc., vol. 25, pp. 959-970, 1990.
Hu, C. et al., "Dielectric and ferroelectric properties of unfilled tungsten bronze KBa3RNb10O30 ceramics", J Mater Sci: Mater Electron, vol. 26, 2015, pp. 515-520.

* cited by examiner

DIELECTRIC CERAMIC COMPOSITION AND CERAMIC CAPACITOR

CROSS REFERENCE TO RELATED APPLICATIONS

The present application is a continuation of International application No. PCT/JP2022/040331, filed Oct. 28, 2022, which claims priority to Japanese Patent Application No. 2021-180445, filed Nov. 4, 2021, the entire contents of each of which are incorporated herein by reference.

TECHNICAL FIELD

The present description relates to a dielectric ceramic composition and a ceramic capacitor.

BACKGROUND ART

Conventionally, ferroelectric ceramics including barium titanate ($BaTiO_3$) have been generally used as a material of the dielectric portion of a ceramic capacitor.

In recent years, ceramic capacitors have been required to have various characteristics with the expansion of application thereof. In order to meet such requirements, dielectric ceramic compositions having various formulations have been proposed as a material for the dielectric portion of a ceramic capacitor. For example, as a new dielectric ceramic composition, a composition having a tetragonal tungsten bronze type structure, which is similar in crystal structure to the perovskite type but has a different polarization structure, has been proposed (see Patent Documents 1 and 2 and the like).

Patent Document 1 discloses a dielectric ceramic composition including a compound shown by a general formula $\{A_{1-x}(RE)_{2x/3}\}_y\text{–}D_2O_{5+y}$ having tungsten bronze-type structure and an oxide of "M", in which "A" is at least one selected from Ba, Ca, Sr and Mg, "D" is at least one selected from Nb and Ta, "RE" is at least one selected from Sc, Y, La, Ce, Pr, Nd, Sm, Eu, Gd, Tb, Dy, Ho, Er, Tm, Yb and Lu, "x" and "y" satisfies $0<x<1$ and $y>0$, respectively and said "M" is at least one selected from Al, Si, B and Li.

Patent Document 2 discloses a dielectric ceramic composition including a main component having a tetragonal tungsten bronze structure represented by the general formula $A_3$ (B1) $(B2)_4O_{15}$ and an accessory component, in which the A is at least one selected from Ba, Sr, Ca, and a rare earth element, the B1 and B2 contain Zr and Nb, the accessory component is at least one selected from Mn, Cu, V, Fe, Co, and Si, when the total of the B1 and B2 is 100 mol %, the total content of Mn, Cu, V, Fe, and Co is 0.5 mol % or more and less than 4 mol %, the content of Si is less than 7 mol %, the content of Ba is 9.8 mol % or more and 61.8 mol % or less, the content of Ca is less than 51.5 mol %, the content of Sr is less than 41.2 mol %, and the content of rare earth elements is less than 30.9 mol %, the ratio of the A to the B1 and B2 is 0.588 or more and 0.618 or less, and when the total is 100 mol %, the content of Zr is more than 8 mol % and less than 50 mol %, and the content of Nb is 50 mol % or more and 80 mol % or less.

Patent Document 3 discloses a dielectric ceramic composition including: an oxide of A, R, and B; and an oxide of Mn, in which the A is at least one selected from the group consisting of K and Na, the R is at least one selected from the group consisting of La, Ce, Pr, Nd, Sm, Eu, Gd, Tb, Dy, Ho, Er, Tm, Yb, Lu, Y, and Sc, the B is at least one selected from the group consisting of Nb and Ta, a molar ratio of the A:R:B:Mn is 2−x: 1+x/3:5+y:z, and the x, y, and z satisfy $-0.3\leq x\leq 0.6$, $-0.5\leq y\leq 0.5$, and $0.001\leq z\leq 0.5$.

Patent Document 1: Japanese Patent Application Laid-Open No. 2013-180908

Patent Document 2: Japanese Patent Application Laid-Open No. 2018-104209

Patent Document 3: International Publication No. WO 2020/240986

Non-Patent Document 1: R. R. Neurgaonkar, et al., "FERROELECTRIC AND STRUCTURAL PROPERTIES OF THE TUNGSTEN BRONZE SYSTEM $K_2Ln^{3+}Nb_5O_{15}$, Ln=La to Lu", Materials Research Bulletin, 1990, Vol. 25, pp. 959-970

SUMMARY OF THE DESCRIPTION

Barium titanate, having a perovskite-type structure, has a drawback that the relative permittivity decreases when a DC voltage is applied due to ferroelectricity (negative bias characteristic). On the other hand, the dielectric ceramic compositions described in Patent Documents 1 and 2, having a tetragonal tungsten bronze type structure, can suppress ferroelectricity to reduce a decrease in relative permittivity under a DC voltage. However, the dielectric ceramic compositions described in Patent Documents 1 and 2 have not realized improved relative permittivity under a DC voltage. In addition, the dielectric ceramic composition described in Patent Document 3, having a tetragonal tungsten bronze type structure, can improve the relative permittivity under a DC voltage. However, in view of expansion of application of ceramic capacitors and improvement of electrical characteristics, improvement in relative permittivity under a DC voltage is further required.

In addition, although not related to a ceramic capacitor, $K_2Ln^{3+}Nb_5O_{15}$ (Ln=La to Lu) has been reported as a substance having another formulation with a tetragonal tungsten bronze type structure (Non-Patent Document 1). Non-Patent Document 1 discloses that a substance having such a formulation exhibits a low relative permittivity and a low resistivity. It is considered that the substance described in Non-Patent Document 1 has a low resistivity, and is difficult to be used as a dielectric under a DC voltage, and the substance is not suitable for use as a material of the dielectric portion of a ceramic capacitor.

An object of the present description is to provide a novel dielectric ceramic composition having a high relative permittivity, a small dielectric loss, an increase in relative permittivity under a DC voltage, and a large maximum increase rate thereof. An additional object of the present description is to provide a ceramic capacitor including the dielectric ceramic composition.

The present description includes the following:

[1] A dielectric ceramic composition including an oxide (I) of A, R, and B, in which the oxide (I) has a tetragonal tungsten bronze type structure;

the A contains K and Ba;

the R is at least one selected from a group consisting of La, Ce, Pr, Nd, Sm, Eu, Gd, Tb, Dy, Ho, Er, Tm, Yb, Lu, Y, and Sc;

the B is at least one selected from a group consisting of Nb and Ta;

the B is contained in an amount of 4.75 mol or more and 5.25 mol or less with respect to 2 mol of the A; and the A, R, and B are contained in a total molar fraction of 0.975 or more with respect to all metal elements contained in the dielectric ceramic composition.

[2] The dielectric ceramic composition according to [1], further including an oxide (II) of X, in which the X is at least one selected from a group consisting of Mn, Cu, Fe, Co, Ni, V, and Si.

[3] The dielectric ceramic composition according to [2], in which the X is contained in an amount of 0.18 mol or less with respect to 2 mol of the A.

[4] The dielectric ceramic composition according to [2], in which the A, R, B, and X are contained in a total molar fraction of 0.8 or more and 1 or less with respect to all metal elements contained in the dielectric ceramic composition.

[5] The dielectric ceramic composition according to any one of [1] to [4], in which the K is contained in a molar fraction of 0.1 or more and 0.95 or less in the A.

[6] The dielectric ceramic composition according to any one of [1] to [5], in which the Ba is contained in a molar fraction of 0.05 or more and 0.9 or less in the A.

[7] The dielectric ceramic composition according to any one of [1] to [6], in which the R is contained in an amount of 0.4 mol or more and 0.967 mol or less with respect to 2 mol of the A.

[8] The dielectric ceramic composition according to any one of [1] to [7], in which the K and the Ba are contained in a total molar fraction of 0.8 or more in the A.

[9] The dielectric ceramic composition according to any one of [1] to [8], in which the A further contains an alkali metal element or an alkaline earth metal element.

[10] The dielectric ceramic composition according to any one of [1] to [9], in which the Nb is contained in a molar fraction of 0.8 or more in the B.

[11] The dielectric ceramic composition according to any one of [1] to [10], in which the K is contained in a molar fraction of 0.2 or more in the A.

[12] The dielectric ceramic composition according to any one of [1] to [11], in which the R is contained in an amount of 0.466 mol or more with respect to 2 mol of the A.

[13] The dielectric ceramic composition according to any one of [1] to [12], in which the La and the Pr are contained in a total molar fraction of 0.333 or more in the R.

[14] The dielectric ceramic composition according to any one of [1] to [13], in which the K and the Ba are contained in a total molar fraction of 1 in the A.

[15] The dielectric ceramic composition according to any one of [1] to [14], in which the Nb is contained in a molar fraction of 1 in the B.

[16] The dielectric ceramic composition according to any one of [1] to [15], in which the oxide of A, R, and B is represented by: $K_{2-2x}Ba_{2x}(A1)_yR_{\sigma(1-2x/3)}B_{5+z}O_{15+\delta}$, in which, A1 is an element other than K and Ba, $0<x<1$, $0\leq y\leq 0.5$, $-0.25\leq z\leq 0.25$, and $-5\leq\delta\leq 7.5$.

[17] The dielectric ceramic composition according to any one of [1] to [16], in which the A is contained in a molar fraction of 0.2 or more and 0.3 or less with respect to all metal elements contained in the oxide (I).

[18] The dielectric ceramic composition according to any one of [1] to [17], in which the B is contained in an amount of 4.75 mol or more and 5.25 mol or less with respect to 2 mol of the A.

[19] A ceramic capacitor including: two electrodes; and a dielectric portion between the two electrodes, in which the dielectric portion comprises the dielectric ceramic composition according to any one of [1] to [18].

According to the present description, it is possible to provide a novel dielectric ceramic composition having a high relative permittivity, a small dielectric loss, an increase in relative permittivity under a DC voltage, and a large maximum increase rate. Additionally, according to the present description, it is possible to provide a ceramic capacitor including the dielectric ceramic composition.

BRIEF EXPLANATION OF THE DRAWINGS

FIG. 2(*b*) shows a graph of dielectric loss tan δ with respect to electric field intensity E for the samples with sample numbers 1 to 3.

DESCRIPTION OF THE PREFERRED EMBODIMENTS

Figure 1:
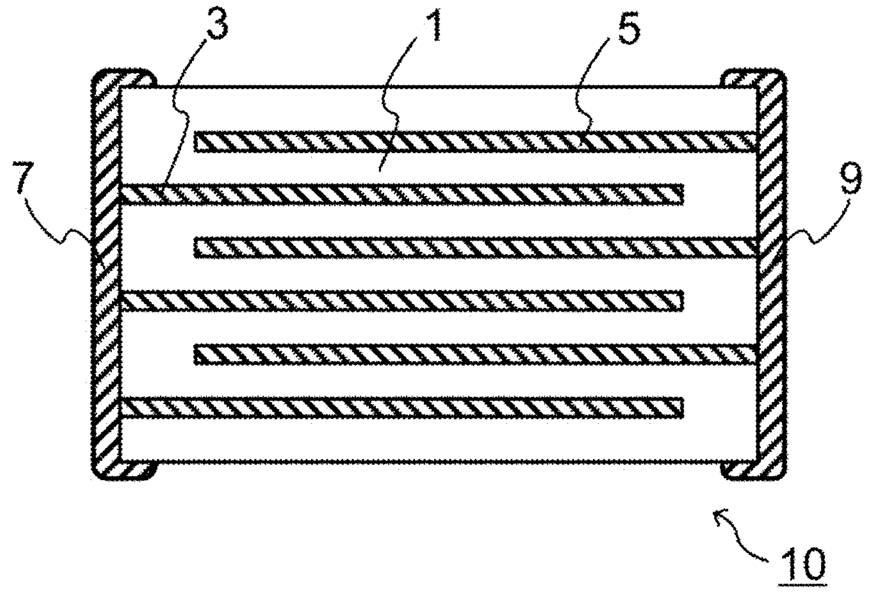
FIG. 1 illustrates a schematic sectional view of a ceramic capacitor according to one embodiment of the present description.

Hereinafter, embodiments of the present description will be described in detail, but the present description is not limited to these embodiments, and various modifications are possible.

(Dielectric Ceramic Composition)

The dielectric ceramic composition of the present embodiment (also simply referred to as "(ferroelectric) dielectric ceramic") contains an oxide (I) of A, R, and B.

The oxide (I) has a tetragonal tungsten bronze type structure;

the A contains K and Ba;

the R is at least one selected from a group consisting of La, Ce, Pr, Nd, Sm, Eu, Gd, Tb, Dy, Ho, Er, Tm, Yb, Lu, Y, and Sc;

the B is at least one selected from a group consisting of Nb and Ta;

the B is contained in an amount of 4.75 mol or more and 5.25 mol or less with respect to 2 mol of the A; and the A, R, and B are contained in a total molar fraction of 0.975 or more with respect to all metal elements contained in the dielectric ceramic composition.

As described above, it has been found from the present inventors' research that the dielectric ceramic composition containing an oxide (I) of A, R, and B achieves a high relative permittivity, a small dielectric loss, an increase in relative permittivity under a DC voltage, and a large maximum increase rate by limiting the A, R, and B, and also limiting the relation between the A and B in amount of substance and the ratio of the oxide (I) in the dielectric ceramic composition so that the above conditions are satisfied.

Here, the "tetragonal tungsten bronze type structure" described in the present specification is based on the crystal structure represented by the general formula $A_6B_{10}O_{30}$ (also represented as $A_3B_5O_{15}$) (see, for example, Non-Patent Document 1), and is characterized by having a tetragonal crystal structure in a certain temperature zone, but is not limited to a tetragonal crystal in other temperature zones, and can have a structure of other crystal systems including an orthorhombic crystal and a monoclinic crystal with displacement of each atomic position. In addition, it is possible to introduce various site defects for the A site, the B site, and the like, interstitial site, site substitution solid solution, and the like to the tetragonal tungsten bronze type structure. Structures in which these are introduced are also called tetragonal tungsten bronze type. In particular, referring to the six A sites in the basic general formula $A_6B_{10}O_{30}$, no A site defect is called filled type, one A site defect is called unfilled type, and 1.33 A site defects is called empty type, each of which is also included in the tetragonal tungsten bronze type structure.

Weather the dielectric ceramic composition includes an oxide (I) of A, R, and B, the amount of the A, R, and B, and the total amount of metal elements contained in the dielectric ceramic composition can be confirmed and determined through any appropriate elemental analysis. Based on the confirmed and determined amount of the A, R, B, and other metal elements, the amount of the B with respect to 2 mol of the A, and the molar fraction of the A, R, and B in all metal elements contained in the dielectric ceramic composition can be confirmed and determined. Weather the oxide (I) has a tetragonal tungsten bronze type structure can be confirmed through X-ray diffraction (XRD) analysis or the like.

In the present specification, the metal element usually includes semimetal elements such as B, Si, Ge, As, Sb, and Te in addition to elements classified as metals.

The oxide of A, R, and B (or the tetragonal tungsten bronze type structure) may be typically represented by the general formula:

$$K_{2-2x}Ba_{2x}(A1)_yR_{\sigma(1-2x/3)}B_{5+z}O_{15+\delta}$$

in which, R and B are as described above, A1 is an element other than K and Ba among elements corresponding to the A, and x, y, and z may satisfy $0<x<1$, $0\le y\le 0.5$, and $-0.25\le z\le 0.25$. Although the present embodiment is not limited, in this case, the B may be located at the B site of the tetragonal tungsten bronze type structure, the K, Ba, and A1 may be located at the A site of the tetragonal tungsten bronze type structure, and R may be located at the A site of the tetragonal tungsten bronze type structure (in a state in which the A is substituted with the R, and the R is solid-solved). The molar ratio in the dielectric ceramic composition can be determined based on the amount of the A (corresponding to "2+y" as the sum of the K, Ba, and A1). Here, the amount (in mole) "15+δ" of oxygen O is difficult to identify by analysis, and δ can take any value depending on the oxidation state or defect state of the substance, but the value of δ does not affect the effect of the present description. Although the present description is not limited, for example, δ may satisfy $-5\le\delta\le 7.5$. In addition, σ may take any value depending on the type of A1 and the ratio of the K, Ba, and A1. Although the present description is not limited, σ may satisfy $0.8\le\sigma\le 1.2$, and may further satisfy $0.9\le\sigma\le 1.1$.

The A includes K and Ba. This makes it possible to have a small dielectric loss while maintaining the relative permittivity, increase the relative permittivity under a DC voltage, and achieve a large maximum increase rate thereof. Although the present description is not bound by any theory, it is considered that both K and Ba, which have roughly the same ionic radius and are different in valency, are contained to moderately suppress ferroelectricity and modulate the polarization structure (modulate the polarization network) of the tetragonal tungsten bronze type structure, thereby obtaining a greater effect.

K may be contained in a molar fraction (or atomic ratio) of, for example, 0.1 or more and 0.2 or more and, for example, 0.95 or less in the A.

Ba may be contained in a molar fraction (or atomic ratio) of, for example, 0.05 or more and, for example, 0.9 or less and 0.8 or less in the A.

K and Ba may be contained in a total molar fraction (or total atomic ratio) of, for example, 0.8 or more, 0.9 or more, and 0.94 or more, and 1 or less in the A.

The A may further contain an alkali metal element such as Na or an alkaline earth metal element such as Sr.

The A may be contained in a molar fraction (or atomic ratio) of, for example, 0.2 or more, 0.23 or more, and 0.25 or more, and, for example, 0.3 or less, and 0.28 or less, in all metal elements contained in the oxide (I).

The R is a rare earth element, and is at least one selected from the group consisting of La, Ce, Pr, Nd, Sm, Eu, Gd, Tb, Dy, Ho, Er, Tm, Yb, Lu, Y, and Sc. Preferably, the R includes La and Pr. As a result, the relative permittivity can be increased under a DC voltage, and the maximum increase rate thereof can be increased. Although the present description is not bound by any theory, it is considered that the combination of La and Pr, which have a large ionic radius, appropriately adjusts the polarization structure (modulates the polarization network) to obtain a greater effect.

In this case, although appropriately selected, La and Pr may be contained in a total molar fraction (or total atomic ratio) of, for example, 0.25 or more, and 0.333 or more, and, for example, 1 or less in the R.

The R may be only La and Pr, or may further contain at least one other element in addition to La and Pr.

The R is contained in an amount of substance of, for example, 0.4 mol or more, 0.466 or more, and, for example, 0.967 mol or less, with respect to 2 mol of the A.

The B is at least one selected from a group consisting of Nb and Ta, and preferably contains Nb.

Nb may be contained in a molar fraction (or atomic ratio) of, for example, 0.8 or more and more than 0.9 and 1 or less in the B.

The B is contained in an amount of 4.75 mol or more and 5.25 mol or less with respect to 2 mol of the A. This makes it possible to have a small dielectric loss while maintaining the relative permittivity, increase the relative permittivity under a DC voltage, and achieve a large maximum increase rate thereof. Although the present description is not bound by any theory, it is considered that the ratio of A and B falls within a certain range to suppress heterogenous phase segregation so that the tetragonal tungsten bronze type structure is maintained, and to modulate the polarization structure (modulate the polarization network) of the tetragonal tungsten bronze type structure, thereby obtaining a greater effect.

The A, R, and B may be contained in a total molar fraction (or total atomic ratio) of 0.975 or more, for example, 0.980 or more, and 0.985 or more, and 1 or less, and 0.997 or less, with respect to all metal elements contained in the ceramic composition. It is considered that the ceramic composition containing A, R, and B in a high molar fraction and having the oxide (I) as a main component is easy to appropriately adjust the polarization structure (easy to modulate the polarization network), and a greater effect can be obtained.

The dielectric ceramic composition may further contain an oxide (II) of X. The existence form of the oxide (II) of X in the dielectric ceramic composition is not particularly limited, and at least a part thereof may be present as the oxide (II) of X, and the oxide (II) of X may be present as a solid solution in the oxide (I) of X. That is, at least a part of the elements (constituent elements) contained in the oxide (II) of X may substitute at least a part of the elements (constituent elements) contained in the oxide (I), and the elements (constituent elements) contained in the oxide (II) of X may penetrate between the elements (constituent elements) contained in the oxide (I).

The X is preferably at least one selected from the group consisting of Mn, Cu, Fe, Co, Ni, V, and Si, and is preferably at least one selected from the group consisting of Mn, Si, Fe, and Cu.

The X may be contained in an amount of substance of, for example, 0.18 mol or less, 0.15 mol or less, and 0.1 mol or less, and, for example, 0 mol or more, and 0.025 mol or more with respect to 2 mol of the A.

The A, R, B, and X may be contained in a total molar fraction (or total atomic ratio) of, for example, 0.8 or more, 0.9 or more, and 0.95 or more, and 1 or less, with respect to all metal elements contained in the dielectric ceramic composition.

The dielectric ceramic composition of the present embodiment contains an oxide (I) of A, R, and B, and optionally further contains an oxide (II) of X, and typically may be substantially composed of the oxide (I) or these oxides (I) and (II). However, the dielectric ceramic composition of the present embodiment may contain other trace substances, for example, trace elements that may be inevitably mixed. In addition, as long as the dielectric composition of the present embodiment contains the oxide of A, R, and B as essential components, the dielectric composition optionally contains any appropriate other third component (in a relatively small amount with respect to the essential components) according to the application desired for the dielectric ceramic composition, and the like.

The dielectric ceramic composition of the present embodiment can be produced by any appropriate method, but can be produced, for example, as follows.

The dielectric ceramic composition of the present embodiment may be obtained by first obtaining a main component composition containing an oxide of A, R, and B, and optionally introducing an oxide of X as an accessory component thereinto. Such a main component composition can be prepared by any suitable method including a solid phase method, a wet method, a gas phase method, or the like. In the solid phase method, at least one selected from the group consisting of oxides, hydroxides, carbonates, and other compounds of each element is used as an element source of the A, R, and B, and a powder mixture of the element sources is calcined to obtain an oxide of the A, R, and B through a solid phase reaction, and the main component composition may be in the form of a calcined raw material powder. Examples of the wet method include a coprecipitation method, a hydrothermal method, and an oxalic acid method. Examples of the gas phase method include a method using high-frequency plasma.

The main component composition may have a tetragonal tungsten bronze type structure made of the oxide of A, R, and B, but this is not essential to the present embodiment as long as a tetragonal tungsten bronze type structure made of the oxide of A, R, and B is obtained in the finally obtained dielectric ceramic composition.

The oxide of X may be introduced into the main component composition by any suitable method. For example, at least one selected from the group consisting of oxides, hydroxides, carbonates, and other compounds of the X may be used as an element source of the X, a powder of the element source of the X may be added to the main component composition, and the X-mixed raw material composition thus obtained may be subjected to a heat treatment to obtain a dielectric ceramic composition into which the oxide of X is introduced. The elemental sources of the A, R, B, and X used may be weighed according to the desired molar ratio for the finally obtained dielectric ceramic composition. Since the amount of X (accessory component) contained in the dielectric ceramic composition is smaller than the amount of the A, R, and B (main component), it is considered that the amount of the X does not substantially affect the tetragonal tungsten bronze type structure made of the oxide of A, R, and B.

The dielectric ceramic composition of the present embodiment has a high relative permittivity. Although the present embodiment is not limited, in a state of room temperature (10 to 30° C., typically 25° C.) and application of no DC voltage, the relative permittivity ε (−) can be, for example, 280 or more, further 330 or more, especially 380 or more, and can be, for example, 1,200 or less, further 800 or less, especially 700 or less. The dielectric loss can be, for example, less than 1%, further 0.8% or less, especially 0.7% or less. The dielectric ceramic composition of the present embodiment can be suitably used as a material of the dielectric portion of a ceramic capacitor.

Furthermore, in the dielectric ceramic composition of the present embodiment, the relative permittivity increases under a DC voltage (positive bias characteristic), and the maximum increase rate thereof is large. The behavior of the relative permittivity under a DC voltage is more specifically described. When the voltage value of the DC voltage is increased from 0 V, the relative permittivity initially increases, exhibits a peak (maximum value) at a certain voltage value, and then decreases in the higher voltage values. When the electric field intensity at which the relative permittivity turns from increase to decrease (electric field intensity at a voltage value showing a peak) is defined as a peak electric field intensity $E_{DC}$, and the relative permittivity at the peak electric field intensity $E_{DC}$ is defined as a peak relative permittivity $\varepsilon_{DC}$ (−, the dielectric ceramic composition of the present embodiment has a large increase rate $\Delta\varepsilon_{DC}$ from the relative permittivity ε (−) when no voltage is applied to the peak relative permittivity $\varepsilon_{DC}$ (−).

The increase rate $\Delta\varepsilon_{DC}$ (%) from the relative permittivity ε (−) when no voltage is applied to the peak relative permittivity $\varepsilon_{DC}$ (−) is calculated by the following formula:

$$\Delta\varepsilon_{DC}(\%)\left( = (\varepsilon_{DC} - \varepsilon)/\varepsilon \times 100\right)$$

and is also referred to as positive bias peak value. The positive bias peak value $\Delta\varepsilon_{DC}$ (%) may be, for example, more than 23%, further 25% or more, particularly 30% or more. In addition, the peak electric field intensity $E_{DC}$ can be, for example, 4 MV/m or more and further 5 MV/m or more, and can be, for example, 20 MV/m or less and further 15 MV/m or less.

The dielectric ceramic composition of the present embodiment can be suitably used as a material of the dielectric portion of a ceramic capacitor for application to which a high DC voltage is applied, and for example, the power loss during charging and discharging of the ceramic capacitor can be effectively reduced.

(Ceramic Capacitor)

The ceramic capacitor of the present embodiment includes: two electrodes; and a dielectric portion located between the two electrodes, in which the dielectric portion is formed from the dielectric ceramic composition described above.

It is sufficient that the ceramic capacitor has at least two electrodes, and the two or three or more electrodes are provided such that the dielectric portion is located therebetween. The electrode may include an internal electrode present inside the dielectric portion and an external electrode present outside the dielectric portion and connected (at least electrically) to a predetermined internal electrode. The material of the electrode is not particularly limited, and any suitable conductive material can be used.

Typically, the ceramic capacitor of the present embodiment can be, for example, a multilayer ceramic capacitor 10 shown in FIG. 1. The multilayer ceramic capacitor 10 includes a dielectric portion 1 formed from the dielectric ceramic composition, internal electrodes 3 and 5 embedded in the dielectric portion 1 and alternately arranged, and external electrodes 7 and 9 connected to the internal electrodes 3 and 5, respectively. In the illustrated example, three internal electrodes 3 and three internal electrodes 5 are schematically illustrated, but the number of internal electrodes can be appropriately selected according to the specification of the capacitor and the like.

The ceramic capacitor of the present embodiment can be manufactured by any appropriate method. For example, in a known method for manufacturing a ceramic capacitor, the X-mixed raw material composition described above regarding the method for manufacturing a dielectric ceramic composition may be used as a ceramic raw material to manufacture the ceramic capacitor of the present embodiment, but the manufacturing method is not limited thereto.

The ceramic capacitor of the present embodiment can achieve the same effects as those of the dielectric ceramic composition of the present embodiment described above, has a high relative permittivity, and has an improved relative permittivity under a DC voltage.

EXAMPLES (Sample Numbers 1 to 37)

According to the following procedure, dielectric ceramic compositions containing an oxide of A, R, and B, and optionally an oxide of X (dielectric ceramic compositions having a tetragonal tungsten bronze type structure made of an oxide of A, R, and B, and optionally further containing an oxide of X) were obtained. The dielectric ceramic compositions were different from each other in the molar ratio of the A, R, B, and X as shown in sample numbers 1 to 37 in Tables 1 to 2. More specifically, manufactured were ceramic capacitors including: two electrodes; and a dielectric portion located between the two electrodes, in which the dielectric portion is formed from the dielectric ceramic compositions different from each other in the molar ratio of A, R, B, and X as described above. Among sample numbers 1 to 37 in Tables 1 to 2, those corresponding to Comparative Examples of the present description are denoted by the symbol "*", and the others correspond to Examples of the present description.

First, $K_2CO_3$, $Na_2CO_3$, $BaCO_3$, $SrCO_3$, $La(OH)_3$, $Pr_6O_{11}$, $Nd(OH)_3$, $Sm_2O_3$, $Gd_2O_3$, $Dy_2O_3$, $Nb_2O_5$, and $Ta_2O_5$ were used as element sources of the A, R, and B, and these element sources were weighed so as to correspond to the molar ratio of each element: the A, R, and B shown in Tables 1 to 2. These element sources were wet-mixed together with PSZ (partly stabilized zirconia) balls having a nominal diameter of 2 mm, pure water, a dispersant, and an anti-foaming agent in a ball mill. The slurry thus obtained was dried, granulated, and then calcined at 1,000 to 1,200° C. in the air to synthesize a calcined raw material powder having a tetragonal tungsten bronze type structure made of an oxide of A, R, and B as a main component composition.

$MnCO_3$, $SiO_2$, $Fe_2O_3$, and CuO were used as an element source of the X, and these element sources were weighed and added to the calcined raw material powder so as to correspond to the molar ratio of the X to each element: the A, R, and B shown in Tables 1 to 2, thereby obtaining an X-mixed raw material composition.

The X-mixed raw material composition was added with a polyvinyl butyral-based binder, a plasticizer, ethanol, and toluene, and wet-mixed with PSZ balls in a ball mill to prepare a ceramic slurry for sheet molding. The ceramic slurry for sheet molding was formed into a sheet shape with a doctor blade method so as to have a sheet thickness of 20 μm to obtain a rectangular ceramic green sheet. Further, a conductive paste containing Pt powder as a conductive component was screen-printed on the ceramic green sheet in a predetermined pattern to form a precursor layer of an internal electrode.

The predetermined number of the ceramic green sheets on which the conductive paste (precursor layer of an internal electrode) containing Pt powder as a conductive component was printed were laminated in such a manner that the side where the conductive paste reached the sheet end (extended to the outside) was staggered, thereby obtaining a laminate. A conductive paste containing Pt powder as a conductive component was applied to both end surfaces of the laminate, where the conductive paste (precursor layer of an internal electrode) was exposed, to form a precursor of an external electrode, and the laminate was heated at 500° C. in the air to perform degreasing treatment. The degreased laminate was held at 1,300 to 1,450° C. for 120 minutes in the air to densify the ceramic containing oxides of elements shown in Tables 1 and 2, and internal electrodes and external electrodes were formed from the conductive paste.

Thus, as schematically shown in FIG. 1, the multilayer ceramic capacitor 10 was manufactured, including a dielectric portion 1 formed from the dielectric ceramic composition, internal electrodes 3 and 5 embedded in the dielectric portion 1 and alternately arranged, and external electrodes 7 and 9 connected to the internal electrodes 3 and 5, respectively. The external dimension of the obtained multilayer ceramic capacitor was 2.7 mm in width, 3.6 mm in length, and 0.56 mm in thickness, the total number of internal electrodes was 2, the thickness of the dielectric layer interposed between the adjacent internal electrodes was 48 μm, the thickness of each internal electrode was 1 μm, and the facing electrode area between the adjacent internal electrodes was 3.2 $mm^2$.

TABLE 1

| Sample | Molar ratio | | | | | | | | | |
|---|---|---|---|---|---|---|---|---|---|---|
| | A | | R | | | | | | B | X |
| number | K | Ba | La | Pr | Nd | Sm | Gd | Dy | Nb | Mn |
| 1 | 40.0 | 160.0 | 41.6 | 5.0 | | | | | 500.0 | 2.5 |
| 2 | 80.0 | 120.0 | 60.0 | 10.0 | | | | | 500.0 | 2.5 |
| 3 | 120.0 | 80.0 | 68.3 | 15.0 | | | | | 500.0 | 2.5 |
| 4 | 120.0 | 80.0 | | 73.3 | | | | | 500.0 | 2.5 |
| 5 | 160.0 | 40.0 | 66.7 | 20.0 | | | | | 500.0 | 2.5 |
| 6 | 190.0 | 10.0 | 72.9 | 23.8 | | | | | 500.0 | 2.5 |
| 7 | 20.0 | 180.0 | 37.5 | 2.5 | | | | | 500.0 | 2.5 |
| 8 | 40.0 | 160.0 | 31.6 | 15.0 | | | | | 500.0 | 2.5 |
| 9 | 80.0 | 120.0 | 30.0 | 30.0 | | | | | 500.0 | 2.5 |
| 10 | 120.0 | 80.0 | 28.3 | 45.0 | | | | | 500.0 | 2.5 |
| 11 | 80.0 | 120.0 | 60.0 | | | | | | 500.0 | 2.5 |
| 12 | 80.0 | 120.0 | 45.0 | | 15.0 | | | | 500.0 | 2.5 |
| 13 | 80.0 | 120.0 | 45.0 | | | 15.0 | | | 500.0 | 2.5 |
| 14 | 80.0 | 120.0 | 45.0 | | | | 15.0 | | 500.0 | 2.5 |
| 15 | 80.0 | 120.0 | 45.0 | | | | | 15.0 | 500.0 | 2.5 |
| 16 | 80.0 | 120.0 | 20.0 | | 40.0 | | | | 500.0 | 2.5 |
| 17 | 80.0 | 120.0 | 10.0 | 10.0 | 40.0 | | | | 500.0 | 2.5 |
| 18 | 80.0 | 120.0 | 15.0 | | 45.0 | | | | 500.0 | 2.5 |
| 19 | 80.0 | 120.0 | 15.0 | | | 45.0 | | | 500.0 | 2.5 |
| *20 | | 200.0 | 33.3 | | | | | | 500.0 | 2.5 |
| *21 | | 200.0 | 16.7 | 16.7 | | | | | 500.0 | 2.5 |
| *22 | | 200.0 | | 33.3 | | | | | 500.0 | 2.5 |
| *23 | 200.0 | | | 100.0 | | | | | 500.0 | 2.5 |
| *24 | 200.0 | | 25.0 | 75.0 | | | | | 500.0 | 2.5 |
| *25 | 200.0 | | 50.0 | 50.0 | | | | | 500.0 | 2.5 |

TABLE 2

| Sample | Molar ratio | | | | | | | | | | | |
|---|---|---|---|---|---|---|---|---|---|---|---|---|
| | A | | | | R | | B | | X | | | |
| number | K | Na | Ba | Sr | La | Pr | Nb | Ta | Mn | Si | Fe | Cu |
| 26 | 80.0 | | 120.0 | | 50.0 | 10.0 | 450.0 | 50.0 | 2.5 | | | |
| 27 | 73.0 | 7.0 | 120.0 | | 50.0 | 10.0 | 500.0 | | 2.5 | | | |
| 28 | 80.0 | | 108.0 | 12.0 | 50.0 | 10.0 | 500.0 | | 2.5 | | | |
| *29 | 80.0 | | 120.0 | | 50.0 | 10.0 | 450.0 | | 2.5 | | | |
| 30 | 80.0 | | 120.0 | | 50.0 | 10.0 | 475.0 | | 2.5 | | | |
| 31 | 80.0 | | 120.0 | | 50.0 | 10.0 | 525.0 | | 2.5 | | | |
| *32 | 80.0 | | 120.0 | | 50.0 | 10.0 | 550.0 | | 2.5 | | | |
| 33 | 80.0 | | 120.0 | | 50.0 | 10.0 | 500.0 | | | 2.5 | | |
| 34 | 80.0 | | 120.0 | | 50.0 | 10.0 | 500.0 | | | | 2.5 | |
| 35 | 80.0 | | 120.0 | | 50.0 | 10.0 | 500.0 | | | | | 2.5 |
| 36 | 80.0 | | 120.0 | | 50.0 | 10.0 | 500.0 | | 10.0 | | | |
| *37 | 80.0 | | 120.0 | | 50.0 | 10.0 | 500.0 | | 20.0 | | | |

The prepared multilayer ceramic capacitor with sample numbers 1 to 37 was dissolved, and subjected to ICP analysis. As a result, the molar ratio was as shown in Tables 1 and 2 except for Pt, which was a main component of the internal electrode and the external electrode. In addition, the multilayer ceramic capacitor with sample numbers 1 to 37 was subjected to XRD analysis (structural analysis). As a result, in all of the samples other than sample number 32, only diffraction peaks identified as a tetragonal tungsten bronze type structure and a modulation structure thereof were obtained, and it was revealed that the multilayer ceramic capacitor had a tetragonal tungsten bronze type structure having no heterogeneous phase. In sample number 32, there were not only diffraction peaks derived from a tetragonal tungsten bronze type structure, but also very small diffraction peaks derived from another crystal phase (heterogeneous phase), which cannot be identified as a tetragonal tungsten bronze type structure. Therefore, it was revealed that there was a heterogenous phase segregation.

The capacitance and dielectric loss tan δ of the prepared multilayer ceramic capacitors with sample numbers 1 to 37 were measured using an LCR meter at room temperature under the conditions of a measurement frequency of 1 kHz and a measurement voltage of 1 Vrms without applying a DC voltage. The relative permittivity ε (−) was calculated from the capacitance. A sample having a dielectric loss tan δ of less than 10% was rated G as having good insulation property, and a sample having a dielectric loss tan δ of 10% or more was rated NG as having poor insulation property.

Here, dielectric loss is generally a value indicating the dielectric characteristics of a material. However, in a case where a leakage current is generated due to insufficient insulation of the sample, the value of dielectric loss tan δ increases corresponding to the current value of leakage current. Since the value of dielectric loss tan δ derived from the dielectric characteristics of the dielectric ceramic composition of the present embodiment was approximately less than 10%, the value of dielectric loss tan δ of 10% or more was determined as having poor insulation property, considering that a leakage current contributes thereto. In the case of poor insulation property, the capacitance under a DC voltage could not be measured as described below.

With a combination of an LCR meter and an external power supply, the capacitance was measured at each voltage by applying a DC voltage while changing the voltage value from 0 V to 770 V under the conditions of a measurement frequency of 1 kHz and a measurement voltage of 1 Vrms at room temperature, and the elative permittivity was calculated. In some samples, the relative permittivity monotonously decreased under a DC voltage (negative bias characteristic), and in some samples, the relative permittivity increased as the voltage increased (positive bias characteristic). In all of the samples showing positive bias characteristic, the relative permittivity had a peak (maximum value) at a certain voltage value, and the relative permittivity turned to decrease in the higher voltage values.

Figure 2A:
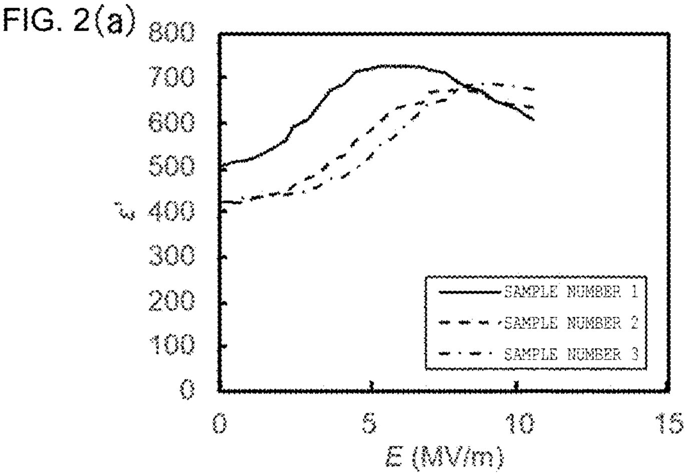
FIG. 2(*a*) shows a graph of relative permittivity ε' with respect to electric field intensity E for the samples with sample numbers 1 to 3.
Figure 2B:
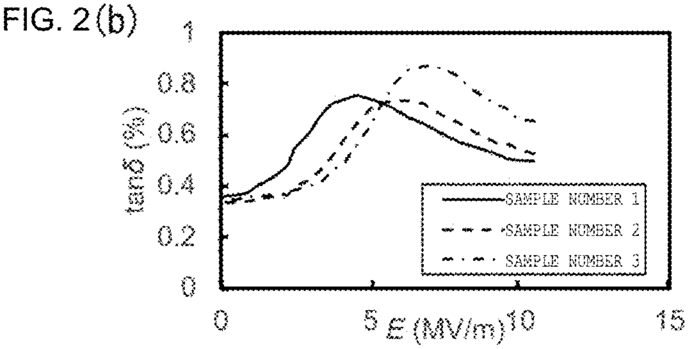

For example, for the samples with sample numbers 1 to 3, the relative permittivity ε' was calculated under the above conditions. As shown in FIG. 2 (*a*), it is found that, when the change in the relative permittivity ε' is plotted against the electric field intensity E (MV/m), the relative permittivity ε' increases, then turns to decrease, and has a peak (maximum value). The same applies to the dielectric loss tan δ, and as shown in FIG. 2 (*b*), it is found that the dielectric loss tan δ increases, then turns to decrease, and has a peak (maximum value).

Therefore, in the samples exhibiting positive bias characteristic, the electric field intensity at which the relative permittivity εhanged from increase to decrease was defined as a peak electric field intensity $E_{DC}$, and the relative permittivity at the peak electric field intensity $E_{DC}$ was defined as a peak relative permittivity $\varepsilon_{DC}$. The increase rate $\Delta\varepsilon_{DC}$ from the relative permittivity ε(−) when no voltage was applied to the peak relative permittivity (positive bias peak value) was calculated based on the following formula.

$$\Delta\varepsilon_{DC}(\%)\left(=(\varepsilon_{DC}-\varepsilon)/\varepsilon(-)\times 100\right)$$

The calculated positive bias peak value of 25% or more was rated as G, and 30% or more thereof was considered to be more suitable in practical use and rated as G+. The results are shown in Table 3. Among sample numbers 1 to 37 in Table 3, those corresponding to Comparative Examples of the present description are denoted by the symbol "*", and the others correspond to Examples of the present description.

TABLE 3

| Sample number | Comprehensive rating | ε (—) | tan δ (%) | $\Delta\varepsilon_{DC}$ (%) | $E_{DC}$ (MV/m) |
|---|---|---|---|---|---|
| 1 | G+ | 498 | 0.34 | 47.4% | 5.8 |
| 2 | G+ | 420 | 0.33 | 59.2% | 7.9 |
| 3 | G+ | 413 | 0.34 | 56.8% | 9.2 |
| 4 | G+ | 509 | 0.40 | 35.0% | 6.7 |
| 5 | G+ | 552 | 0.32 | 32.5% | 10.4 |
| 6 | G+ | 498 | 0.38 | 31.4% | 8.6 |
| 7 | G | 550 | 0.45 | 26.5% | 4.2 |
| 8 | G+ | 569 | 0.36 | 33.5% | 5.4 |
| 9 | G+ | 469 | 0.36 | 40.8% | 7.1 |
| 10 | G+ | 451 | 0.34 | 36.4% | 8.3 |
| 11 | G+ | 456 | 0.32 | 42.5% | 5.6 |
| 12 | G+ | 472 | 0.46 | 41.5% | 7.0 |
| 13 | G+ | 430 | 0.42 | 37.6% | 6.5 |
| 14 | G+ | 421 | 0.35 | 33.5% | 5.9 |
| 15 | G+ | 432 | 0.37 | 32.5% | 5.2 |
| 16 | G+ | 430 | 0.33 | 36.6% | 7.5 |
| 17 | G+ | 502 | 0.39 | 30.2% | 9.5 |
| 18 | G | 450 | 0.34 | 28.5% | 4.0 |
| 19 | G | 520 | 0.34 | 26.2% | 5.0 |
| *20 | NG | 701 | 1.24 | Monotonously decreased | |
| *21 | NG | 1321 | 3.76 | Monotonously decreased | |
| *22 | NG | 970 | 5.12 | Monotonously decreased | |
| *23 | NG | 676 | 0.43 | 11.5% | 6.6 |
| *24 | NG | 682 | 0.42 | 22.5% | 7.2 |
| *25 | NG | 866 | 0.38 | 6.5% | 3.3 |
| 26 | G | 378 | 0.43 | 28.6% | 8.2 |
| 27 | G | 328 | 0.34 | 26.7% | 7.6 |
| 28 | G | 283 | 0.33 | 29.8% | 7.3 |
| *29 | NG | 420 | 3.3 | Monotonously decreased | |
| 30 | G+ | 390 | 0.52 | 45.5% | 8.9 |
| 31 | G+ | 388 | 0.4 | 46.5% | 7.5 |
| *32 | NG | 1020 | 52.4 | Poor insulation property | |
| 33 | G+ | 413 | 0.33 | 58.5% | 7.9 |
| 34 | G+ | 432 | 0.33 | 54.5% | 7.3 |
| 35 | G+ | 423 | 0.33 | 56.5% | 7.5 |
| 36 | G+ | 410 | 0.67 | 45.5% | 9.2 |
| *37 | NG | 670 | 14.5 | Poor insulation property | |

Referring to Table 3, among sample numbers 1 to 37, the samples corresponding to Examples of the present description (without the symbol "*") all had a comprehensive rating of "G" or "G+", a high relative permittivity ε, and a small dielectric loss tan δ, and a high positive bias peak value $\Delta\varepsilon_{DC}$ (that is, the relative permittivity increased under a DC voltage, and the maximum increase rate thereof was large). As described above, it can be said that both good insulation property and positive bias characteristic can be achieved. In addition, as shown in sample numbers 1 to 6, 8 to 17, 30, 31, and 33 to 36, a larger change rate $\Delta\varepsilon_{DC}$ of the relative permittivity was obtained under a DC voltage when the A was K and Ba, La and Pr was contained in a total molar fraction of 0.333 or more in the R, the B was Nb, K was contained in a molar fraction of 0.2 or more in the A, and the R was contained in an amount of 0.466 or more with respect to 2 mol of the A. Although the present description is not bound by any theory, this is presumably because ferroelectricity was moderately suppressed and the polarization network of the crystal system was properly modulated.

On the other hand, among sample numbers 1 to 37, the samples corresponding to Comparative Examples of the present description (those denoted by the symbol "*") all had a comprehensive rating of "NG". As in the case of sample numbers 20 to 22, when the A did not contain K, ferroelectricity was strongly exhibited. Therefore, the relative permittivity monotonously decreased under a DC voltage, and a positive bias characteristic was not exhibited. As in the case of sample numbers 23 to 25, when the A did not contain Ba, the polarization structure was not sufficiently modulated, and a positive bias characteristic was exhibited, but the positive bias peak value $\Delta\varepsilon_{DC}$ was not sufficiently satisfied. As shown in sample number 29, when the B was contained in an amount of less than 4.75 mol with respect to 2 mol of the A, ferroelectricity was strongly exhibited. Therefore, the relative permittivity monotonously decreased under a DC voltage, and a positive bias characteristic was not exhibited. As shown in sample number 32, when the B was contained in an amount of more than 5.5 mol with respect to 2 mol of the A, a heterogenous phase segregation (segregation of crystal phases having no tetragonal tungsten type structure) occurred, and the insulation property was deteriorated. As shown in sample number 37, when the A, R, and B were contained in a total molar fraction of less than 0.975 with respect to all metal elements contained in the dielectric ceramic composition, impurity segregation slightly occurred, thereby deteriorating the insulation property.

The dielectric ceramic composition of the present description can be suitably used as a material of the dielectric portion of a ceramic capacitor, but is not limited thereto. The ceramic capacitor of the present description can be used in a wide variety of application to which a DC voltage is applied, but is not limited thereto.

DESCRIPTION OF REFERENCE SYMBOLS

1: Dielectric portion (dielectric layer)
3, 5: Internal electrode
7, 9: External electrode
10: Ceramic capacitor (multilayer ceramic capacitor)

The invention claimed is:

1. A dielectric ceramic composition comprising an oxide (I) of A, R, and B, wherein
- the oxide (I) has a tetragonal tungsten bronze type structure;
- the A contains K and Ba;
- the R is at least one selected from a group consisting of La, Ce, Pr, Nd, Sm, Eu, Gd, Tb, Dy, Ho, Er, Tm, Yb, Lu, Y, and Sc;
- the B is at least one selected from a group consisting of Nb and Ta;
- the B is contained in an amount of 4.75 mol or more and 5.25 mol or less with respect to 2 mol of the A; and
- the A, R, and B are contained in a total molar fraction of 0.975 or more with respect to all metal elements contained in the dielectric ceramic composition.

2. The dielectric ceramic composition according to claim 1, further comprising an oxide (II) of X, wherein the X is at least one selected from a group consisting of Mn, Cu, Fe, Co, Ni, V, and Si.

3. The dielectric ceramic composition according to claim 2, wherein the X is contained in an amount of 0.18 mol or less with respect to 2 mol of the A.

4. The dielectric ceramic composition according to claim 2, wherein the A, R, B, and X are contained in a total molar fraction of 0.8 or more and 1 or less with respect to all metal elements contained in the dielectric ceramic composition.

5. The dielectric ceramic composition according to claim 1, wherein the K is contained in a molar fraction of 0.1 or more and 0.95 or less in the A.

6. The dielectric ceramic composition according to claim 1, wherein the Ba is contained in a molar fraction of 0.05 or more and 0.9 or less in the A.

7. The dielectric ceramic composition according to claim 1, wherein the R is contained in an amount of 0.4 mol or more and 0.967 mol or less with respect to 2 mol of the A.

8. The dielectric ceramic composition according to claim 1, wherein the K and the Ba are contained in a total molar fraction of 0.8 or more in the A.

9. The dielectric ceramic composition according to claim 1, wherein the A further contains an alkali metal element or an alkaline earth metal element.

10. The dielectric ceramic composition according to claim 1, wherein the Nb is contained in a molar fraction of 0.8 or more in the B.

11. The dielectric ceramic composition according to claim 1, wherein the K is contained in a molar fraction of 0.2 or more in the A.

12. The dielectric ceramic composition according to claim 1, wherein the R is contained in an amount of 0.466 mol or more with respect to 2 mol of the A.

13. The dielectric ceramic composition according to claim 1, wherein the La and the Pr are contained in a total molar fraction of 0.333 or more in the R.

14. A dielectric ceramic composition comprising an oxide (I) of A, R, and B, wherein:
- the oxide (I) has a tetragonal tungsten bronze type structure;
- the A contains K and Ba;
- the R is at least one selected from a group consisting of La, Ce, Pr, Nd, Sm, Eu, Gd, Tb, Dy, Ho, Er, Tm, Yb, Lu, Y, and Sc;
- the B is at least one selected from a group consisting of Nb and Ta;
- the B is contained in an amount of 4.75 mol or more and 5.25 mol or less with respect to 2 mol of the A;
- the A, R, and B are contained in a total molar fraction of 0.975 or more with respect to all metal elements contained in the dielectric ceramic composition; and
- the K and the Ba are contained in a total molar fraction of 1 in the A.

15. The dielectric ceramic composition according to claim 1, wherein the Nb is contained in a molar fraction of 1 in the B.

16. A dielectric ceramic composition comprising an oxide (I) of A, R, and B, wherein:
- the oxide (I) has a tetragonal tungsten bronze type structure;
- the A contains K and Ba;
- the R is at least one selected from a group consisting of La, Ce, Pr, Nd, Sm, Eu, Gd, Tb, Dy, Ho, Er, Tm, Yb, Lu, Y, and Sc;
- the B is at least one selected from a group consisting of Nb and Ta;
- the B is contained in an amount of 4.75 mol or more and 5.25 mol or less with respect to 2 mol of the A;
- the A, R, and B are contained in a total molar fraction of 0.975 or more with respect to all metal elements contained in the dielectric ceramic composition, and wherein the oxide of A, R, and B is represented by:

$$K_{2-2x}Ba_{2x}(A1)_yR_{\sigma(1-2x/3)}B_{5+z}O_{15+\delta}$$

in which, A1 is an element other than K and Ba, $$0 < x < 1,$$

$$0 \le y \le 0.5, ,$$

$$-0.25 \le z \le 0.25, \text{ and}$$

$$-5 \le \delta \le 7.5.$$

17. The dielectric ceramic composition according to claim 1, wherein the A is contained in a molar fraction of 0.2 or more and 0.3 or less with respect to all metal elements contained in the oxide (I).

18. A ceramic capacitor comprising:

two electrodes; and a dielectric portion between the two electrodes, wherein the dielectric portion comprises the dielectric ceramic composition according to claim 1.

19. The dielectric ceramic composition according to claim 1, wherein the A further comprises at least one selected from the group consisting of Na and Sr.

* * * * *